United States Patent
Ito (10) Patent No.: US 12,008,172 B2
(45) Date of Patent: Jun. 11, 2024

(54) POSITION DETECTION DEVICE AND PROGRAM

(71) Applicant: Wacom Co., Ltd., Saitama (JP)

(72) Inventor: Akira Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 70 days.

(21) Appl. No.: 17/334,358

(22) Filed: May 28, 2021

(65) Prior Publication Data

US 2022/0004266 A1    Jan. 6, 2022

(30) Foreign Application Priority Data

Jul. 1, 2020  (JP) .................................. 2020-114195

(51) Int. Cl.
| | |
|---|---|
| *G06F 3/03* | (2006.01) |
| *G06F 3/0346* | (2013.01) |
| *G06F 3/0354* | (2013.01) |
| *G06F 3/041* | (2006.01) |
| *G06N 20/00* | (2019.01) |

(52) U.S. Cl.
CPC .......... *G06F 3/0317* (2013.01); *G06F 3/0346* (2013.01); *G06F 3/03546* (2013.01); *G06F 3/04162* (2019.05); *G06N 20/00* (2019.01); *G06F 2203/04104* (2013.01); *G06F 2203/04105* (2013.01)

(58) Field of Classification Search
CPC ............... G06F 3/04162; G06F 3/0346; G06F 3/03545; G06F 3/03546; G06F 2203/04104; G06F 2203/04101
See application file for complete search history.

(56) References Cited

U.S. PATENT DOCUMENTS

| | | | |
|---|---|---|---|
| 2006/0109252 A1* | 5/2006 | Kolmykov-Zotov | ........................ G06F 3/03545 345/173 |
| 2013/0321351 A1* | 12/2013 | Paul | .................... G06F 3/03545 345/179 |
| 2016/0139690 A1* | 5/2016 | Chang | ................... G06F 3/0338 345/179 |
| 2018/0121052 A1 | 5/2018 | Durojaiye et al. | |

(Continued)

FOREIGN PATENT DOCUMENTS

| | | |
|---|---|---|
| JP | 2006146936 A | 6/2006 |
| JP | 2011081646 A | 4/2011 |

(Continued)

OTHER PUBLICATIONS

Japanese Office Action, dated Dec. 26, 2023, for Japanese Patent Application No. 2020-114195. (9 pages) (with English translation).

*Primary Examiner* — Priyank J Shah (74) *Attorney, Agent, or Firm* — Seed IP Law Group LLP (57) ABSTRACT

A position detection device includes a communication circuit which, in operation, receives, from a stylus including a built-in acceleration sensor, acceleration information detected by the acceleration sensor, and a controller which, in operation, detects a first position indicating a position of the stylus on a touch surface and a second position indicating a position of a finger on the touch surface, and outputs the first position and the second position that have been detected. The controller controls the output of the second position based on the acceleration information received by the communication circuit.

20 Claims, 9 Drawing Sheets

(56) References Cited

U.S. PATENT DOCUMENTS

2021/0389833 A1* 12/2021 Maeyama ............. G06F 3/0418
2022/0206593 A1*  6/2022 Park ....................... H02J 50/12

FOREIGN PATENT DOCUMENTS

| JP | 2011-232806 A | 11/2011 |
| JP | 2017535831 A | 11/2017 |
| JP | 2017220187 A | 12/2017 |
| JP | 2019192142 A | 10/2019 |
| JP | 2020071548 A |  5/2020 |

* cited by examiner

POSITION DETECTION DEVICE AND PROGRAM

BACKGROUND

Technical Field

The present disclosure relates to a position detection device and a computer-readable storage medium.

Background Art

A position detection device supporting both input with a finger or a palm (hereinafter referred to as "touch input") and input using a stylus (hereinafter referred to as "pen input") is known. While a user of this type of position detection device is performing pen input, part of the user's hand such as a finger or a palm may, in some cases, happen to contact a touch surface of the position detection device. In this case, the position detection device may detect the touch input despite the user's intention. To prevent the detection of such unintended touch input (hereinafter referred to as "false detection"), some position detection devices perform a process of turning off touch input while pen input is being detected or a process of ignoring a region in which touch input is being detected, when the area of this region is equal to or greater than a predetermined value (palm rejection).

Further, a stylus including a built-in acceleration sensor and posture sensor is also known. Japanese Patent Laid-Open No. 2011-232806 (hereinafter referred to as "Patent Document 1") discloses an example of this type of stylus. The technique disclosed in Patent Document 1 uses the detection results of the acceleration sensor and the posture sensor to determine whether or not the stylus is in use, and to determine the dominant hand of the user using this stylus.

Incidentally, sufficiently preventing false detection of touch input has been difficult with the above-described processes for preventing the false detection.

BRIEF SUMMARY

Therefore, it is desirable to provide a position detection device and a program that can suitably prevent false detection of touch input that is made by part of the user's hand, such as a finger or a palm, while the user is performing input using a stylus.

According to an embodiment of the present disclosure, there is provided a position detection device including a communication circuit which, in operation, receives, from a stylus including a built-in acceleration sensor, acceleration information detected by the acceleration sensor, and a controller which, in operation, detects a first position indicating a position of the stylus on a touch surface and a second position indicating a position of a finger on the touch surface and output the first position and the second position that have been detected, the controller controlling the output of the second position based on the acceleration information received by the communication circuit.

According to an embodiment of the present disclosure, there is provided a non-transitory computer-readable storage medium storing a program that, when executed by one or more processors, causes a computer, which includes a communication circuit that receives, from a stylus including a built-in acceleration sensor, acceleration information detected by the acceleration sensor, to: detect a first position indicating a position of the stylus on a touch surface and a second position indicating a position of a finger on the touch surface, and output the first position and the second position that have been detected, and control the output of the second position based on the acceleration information received by the communication circuit.

According to the embodiment of the present disclosure, false detection of touch input during pen input can be prevented suitably.

DETAILED DESCRIPTION

Hereinafter, an embodiment of the present disclosure will be described in detail with reference to the accompanying drawings.

Figure 1:
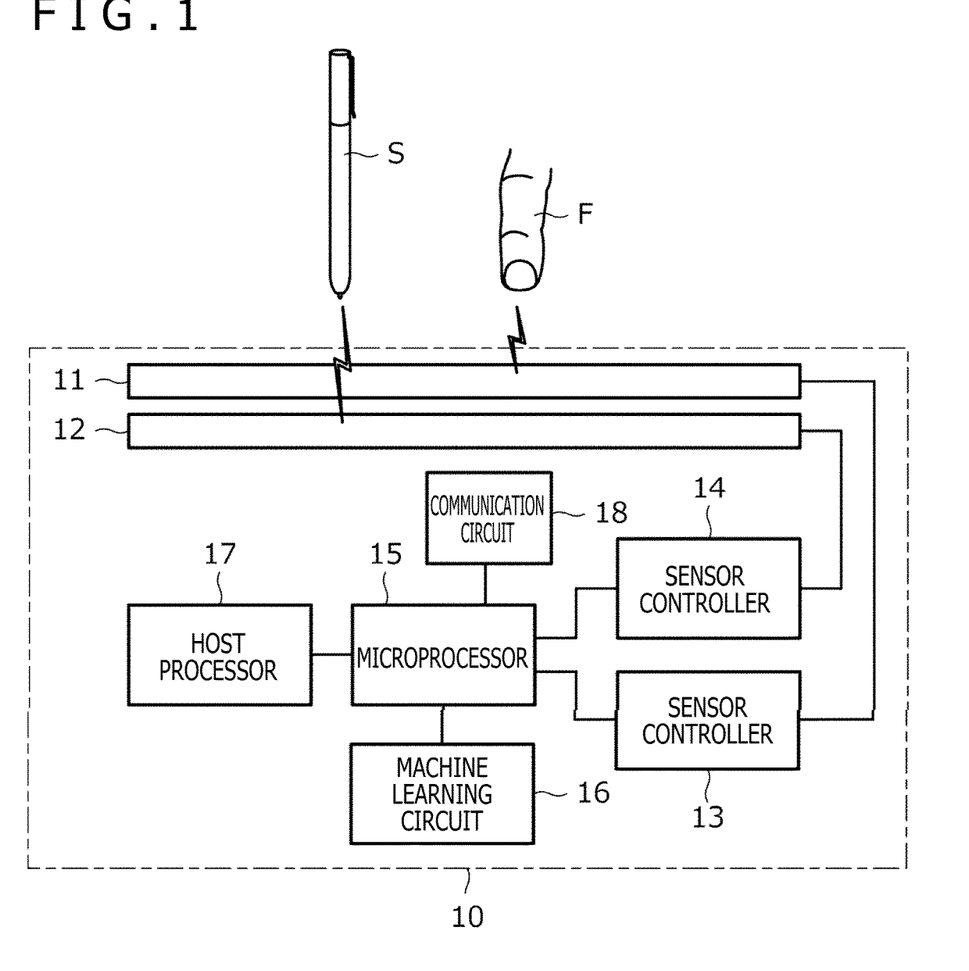
FIG. 1 is a diagram illustrating an internal configuration of an electronic device according to an embodiment of the present disclosure.

FIG. 1 is a diagram illustrating an internal configuration of an electronic device 10 according to the embodiment of the present disclosure. The electronic device 10 is typically a tablet terminal (computer) including a display. The electronic device 10 functions as a position detection device that detects the position of each of a stylus S and a finger F of a user, which are illustrated in FIG. 1, on a touch surface. The touch surface also serves as a display surface of the display. The electronic device 10 may be a digitizer without a display.

As illustrated in FIG. 1, the electronic device 10 includes sensors 11 and 12, sensor controllers 13 and 14, a microprocessor 15, a machine learning circuit 16, a host processor 17, and a communication circuit 18. The sensor controllers 13 and 14, the microprocessor 15, and the machine learning circuit 16 constitute a controller of the position detection device.

The sensor 11 is a touch sensor using a capacitive method and includes a plurality of electrodes disposed in the touch surface. The sensor controller 13 is an integrated circuit that detects the position of the finger F on the touch surface by detecting a change in capacitance that occurs in each of the electrodes included in the sensor 11. Hereinafter, the position of the finger F detected in this manner will be referred to as a "touch position." The sensor controller 13 sequentially writes coordinate data which indicates the detected touch position, to a memory built in the microprocessor 15.

The sensor 12 is a touch sensor using an electromagnetic resonance (EMR) method and includes a plurality of loop coils disposed in the touch surface. A specific configuration of the sensor 12 will be described later with reference to FIG. 3. The sensor controller 14 is an integrated circuit that detects the position of the stylus S on the touch surface by causing a current signal to flow through each of the loop coils included in the sensor 12 to thereby generate a magnetic field and receiving, in each loop coil, a reflection signal transmitted from the stylus S that has entered the magnetic field. Hereinafter, the signal received from the stylus S through the sensor 12 will be referred to as a "pen signal," and the position of the stylus S on the touch surface will be referred to as a "pen position."

The sensor controller 14 also has a function of receiving data transmitted from the stylus S, by demodulating the pen signal transmitted from the stylus S. Hereinafter, the data received from the stylus S through the sensor 12 will be referred to as "pen data." The pen data includes a writing pressure value and switch information. The writing pressure value indicates a pressure applied to a pen tip of the stylus S. The switch information indicates on/off of an operation switch SW (see FIG. 2) disposed on a side surface or an end portion of the stylus S. The sensor controller 14 sequentially writes the coordinate data indicating the detected pen position and the received pen data to the memory of the microprocessor 15.

The microprocessor 15 is a processor including the built-in memory. By reading and executing a program stored in the memory, the microprocessor 15 controls the sensor controllers 13 and 14, performs processes based on various pieces of data input from the sensor controllers 13 and 14, and outputs the results of the processes to the host processor 17. The processes performed by the microprocessor 15 include a process for suitably preventing false detection of touch input during pen input. The details will be described later.

The machine learning circuit 16 is a processor including a built-in memory. In one or more embodiments, the functions of the machine learning circuit 16 described below are performed by the microprocessor 15. By reading and executing a program stored in a memory, the machine learning circuit 16 functions as a neural network that performs supervised learning, and outputs restriction/no-restriction indication information based on various pieces of information input from the microprocessor 15. The restriction/no-restriction indication information indicates whether or not to restrict the output of the touch position. The microprocessor 15 stops outputting the touch position when the restriction/no-restriction indication information that is output from the machine learning circuit 16 indicates a restriction on the output of the touch position. The details will be described later.

The host processor 17 is a central processing unit of the electronic device 10. By reading and executing a program stored in a storage device of the electronic device 10, the host processor 17 controls each components of the electronic device 10 and implements various applications including a drawing application. The processes performed by the drawing application include a process of generating stroke data based on the position and information supplied from the microprocessor 15, storing the generated stroke data in the storage device as digital ink, and rendering and displaying the digital ink on the display.

The communication circuit 18 is a functional unit that performs wireless communication according to a short-range wireless communication standard such as BLUETOOTH (registered trademark) low energy (BLE). In the present embodiment, the communication circuit 18 communicates with a communication circuit 20 (see FIG. 2) of the stylus S. The communication circuit 18 outputs data received through communication with the stylus S, to the microprocessor 15.

Figure 2:
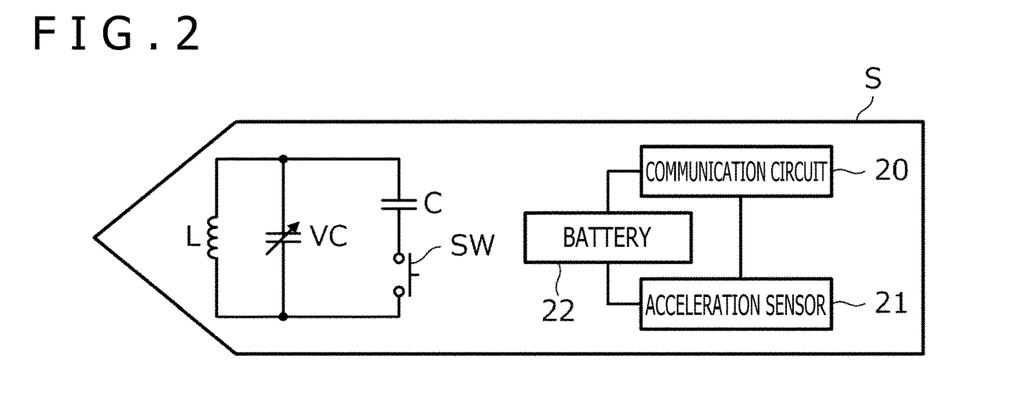
FIG. 2 is a diagram illustrating an internal configuration of a stylus illustrated in FIG. 1.

FIG. 2 is a diagram illustrating an internal configuration of the stylus S illustrated in FIG. 1. As illustrated in FIG. 2, the stylus S includes a coil L, a variable capacitor VC, a fixed capacitor C, the operation switch SW, the communication circuit 20, an acceleration sensor 21, and a battery 22.

The coil L, the variable capacitor VC, and the fixed capacitor C are connected in parallel, constituting an LC resonant circuit. The operation switch SW is connected in series with the fixed capacitor C.

The variable capacitor VC is a capacitor whose capacitance is changed according to the writing pressure value described above. The operation switch SW is a switch disposed on the side surface or the end portion of the stylus S and can be turned on and off by the user. When the operation switch SW is turned off, the fixed capacitor C is disconnected from the circuit. When the operation switch SW is turned on, the fixed capacitor C is incorporated into the circuit.

The acceleration sensor 21 is a three-axis inertial sensor and can detect the inertial motion of the stylus S in three dimensions. Note that the acceleration sensor 21 may be a one- or two-axis inertial sensor. However, since the three-axis inertial sensor can detect the tilt of the stylus S, the three-axis inertial sensor is more suitable as the acceleration sensor 21 from the viewpoint that the machine learning circuit 16 can output a more appropriate result.

The communication circuit 20 is a functional unit that performs wireless communication according to the same standard as the communication circuit 18 illustrated in FIG. 1, and can communicate with the communication circuit 18. Through this communication, the communication circuit 20 transmits data indicating the detection result of the acceleration sensor 21 (hereinafter referred to as "acceleration information") to the communication circuit 18. The battery 22 supplies electric power to the acceleration sensor 21 and the communication circuit 20.

Figure 3:
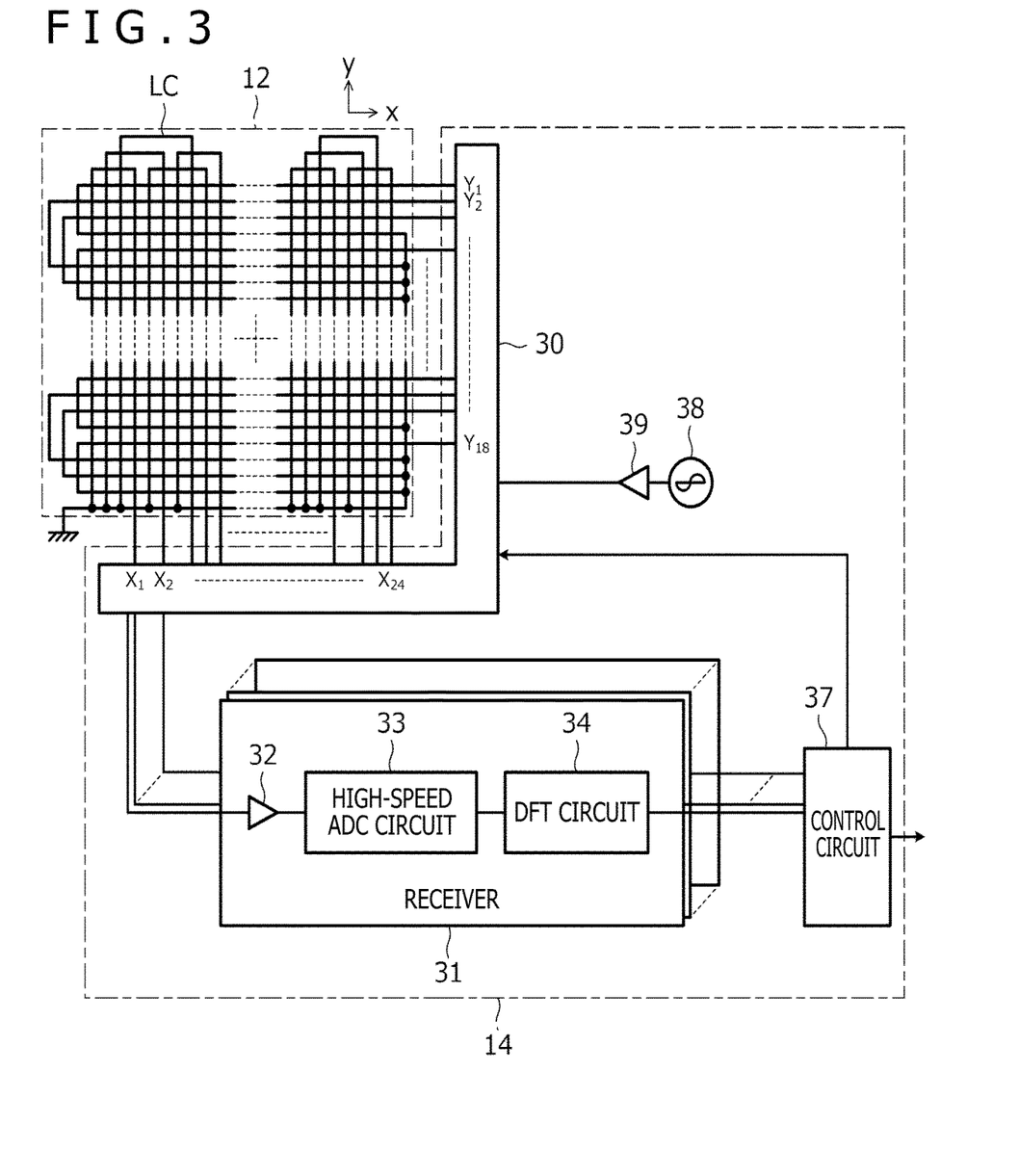
FIG. 3 is a diagram illustrating internal configurations of a sensor and a sensor controller illustrated in FIG. 1.

FIG. 3 is a diagram illustrating internal configurations of the sensor 12 and the sensor controller 14 illustrated in FIG. 1. As illustrated in FIG. 3, the sensor 12 includes a plurality of loop coils LC disposed in a rectangular planar region. One end of each loop coil LC is grounded, while the other end of each loop coil LC is connected to the sensor controller 14. As an example of the plurality of loop coils LC, 24 X-side loop coils $X_1$ to $X_{24}$ extending in a y-direction and 18 Y-side loop coils $Y_1$ to $Y_{18}$ extending in an x-direction perpendicular to the y-direction are illustrated in FIG. 3. Although, in the present embodiment, these 32 loop coils $X_1$ to $X_{24}$ and $Y_1$ to $Y_{18}$ are assumed to be disposed in the sensor 12, the number of loop coils LC disposed in the sensor 12 is not limited thereto.

As illustrated in FIG. 3, the sensor controller 14 includes a selection circuit 30, a plurality of receivers 31, a control circuit 37, an oscillator 38, and a current driver 39. Each receiver 31 includes an amplifier 32, a high-speed analog-to-digital conversion (ADC) circuit 33, and a discrete Fourier transform (DFT) circuit 34.

The selection circuit 30 is connected to the other end of each loop coil LC, an input end of each receiver 31, and an output end of the current driver 39. According to the control of the control circuit 37, the selection circuit 30 selects one or more loop coils LC and connects each of the selected one or more loop coils LC to the input end of a corresponding one of the receivers 31 or the output end of the current driver 39.

The amplifier 32 is a circuit that amplifies a voltage signal supplied from the selection circuit 30 and then outputs the amplified voltage signal to the high-speed ADC circuit 33. The high-speed ADC circuit 33 is a circuit that generates a digital signal by sampling the voltage signal output from the amplifier 32. The DFT circuit 34 converts the digital signal generated by the high-speed ADC circuit 33, from a time domain to a frequency domain, thereby generating a digital signal of each frequency. Then the DFT circuit 34 outputs the digital signal of each frequency to the control circuit 37.

The control circuit 37 is a processor including a built-in memory. By reading and executing a program stored in the memory, the control circuit 37 controls the selection circuit 30 and performs a process of acquiring the pen position and the pen data described above based on the output signal of each receiver 31.

The oscillator 38 is a circuit that generates an alternating-current signal of a predetermined frequency. The current driver 39 converts the alternating-current signal output from the oscillator 38, into a current signal, and supplies the current signal to the selection circuit 30.

The following briefly describes how the control circuit 37 acquires the pen position and the pen data. The control circuit 37 first controls the selection circuit 30 so as to select one or more loop coils LC and connect the selected one or more loop coils LC to the common output end of the current driver 39. This causes a current signal to flow through the selected one or more loop coils LC, generating a magnetic field described above. Note that, separately from the loop coils $X_1$ to $X_{24}$ and $Y_1$ to $Y_{18}$, a loop coil dedicated to the magnetic field generation may be disposed along the outer periphery of the sensor 12. In this case, only this dedicated loop coil may be selected at this stage.

When the stylus S enters the generated magnetic field, an induction voltage is generated in the coil L (see FIG. 2) of the stylus S, and electric charges are accumulated in the variable capacitor VC and the fixed capacitor C (with the operation switch SW turned on). After a predetermined period of time has elapsed since the one or more loop coils LC were connected to the output end of the current driver 39, the control circuit 37 controls the selection circuit 30 so as to select one or more loop coils LC and connect each of the selected one or more loop coils LC to the input end of a corresponding different one of the receivers 31. Then, the generation of the magnetic field from the loop coils LC ends, and a pen signal is transmitted from the coil L of the stylus S. The frequency of the pen signal transmitted in this manner becomes equal to the resonant frequency of the LC resonant circuit described above. Since the resonant frequency of the LC resonant circuit varies depending on the capacitance of the variable capacitor VC and connection or disconnection of the fixed capacitor C, the frequency of the pen signal reflects the writing pressure value and the switch information described above.

The control circuit 37 acquires the reception strength of the pen signal in each loop coil LC based on the digital signal supplied from each receiver 31 and derives the pen position based on this result. Further, the control circuit 37 acquires pen data (a writing pressure value and switch information) transmitted from the stylus S, by acquiring the frequency of the pen signal based on the digital signal supplied from each receiver 31. The control circuit 37 outputs the pen position and pen data acquired in this manner, to the microprocessor 15 each time the pen position and the pen data are acquired.

Next, a position detection process performed by the microprocessor 15 according to the present embodiment will be described in more detail with reference to processing flow diagrams. The microprocessor 15 performs processes for suitably preventing false detection of touch input during pen input, which will be described in detail. A pen position detection process performed by the sensor controller 14 will also be described in detail.

Figure 4:
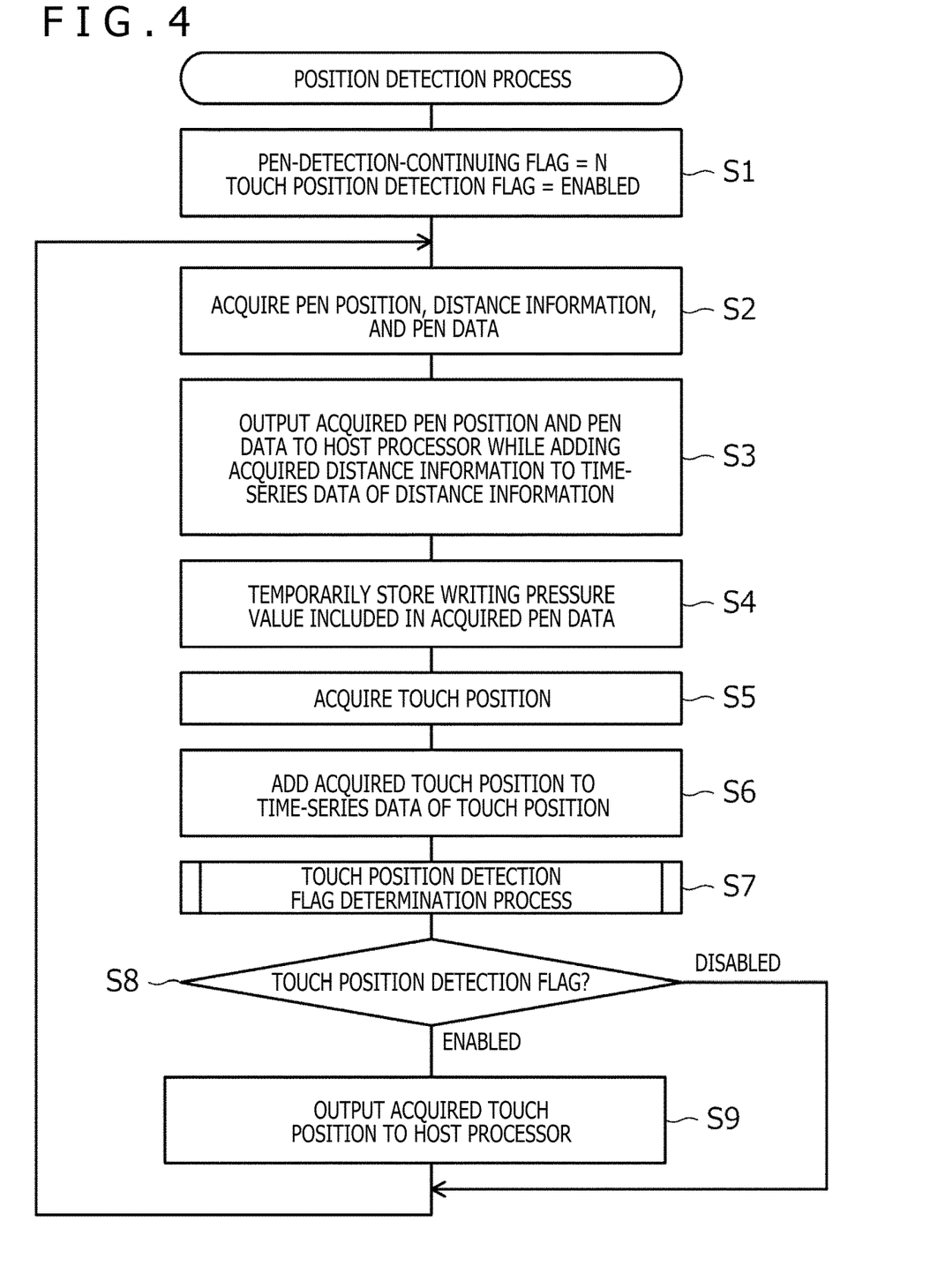
FIG. 4 is a processing flow diagram illustrating a position detection process performed by a microprocessor illustrated in FIG. 1.

FIG. 4 is a processing flow diagram illustrating the position detection process performed by the microprocessor 15. As illustrated in FIG. 4, when power is turned on, the microprocessor 15 first initializes a pen-detection-continuing flag and a touch position detection flag, which are variables (S1). Specifically, the microprocessor 15 sets the pen-detection-continuing flag to "negative (N)" and the touch position detection flag to "enabled." Note that the touch position detection flag corresponds to the restriction/no-restriction indication information described above. After that, the microprocessor 15 acquires the pen position, distance information, and pen data (S2) which are written to the memory by the sensor controller 14 at S29 or S38 described later. Note that the distance information indicates the distance between the stylus S and the touch surface.

Figure 5:
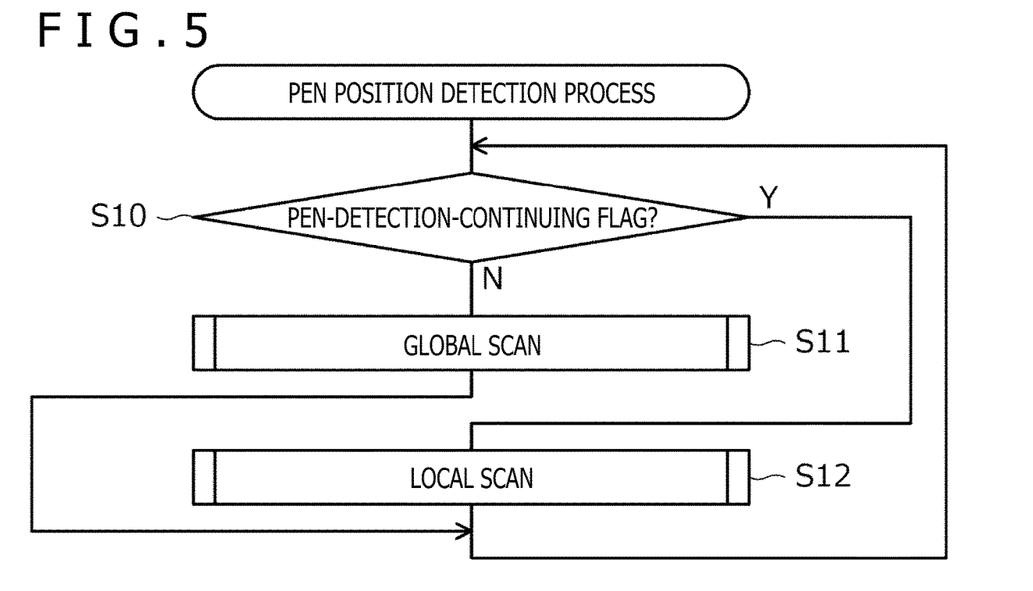
FIG. 5 is a processing flow diagram illustrating the details of a pen position detection process performed by the sensor controller illustrated in FIG. 1.

FIG. 5 is a processing flow diagram illustrating the details of the pen position detection process performed by the control circuit 37 of the sensor controller 14 to generate the pen position, the distance information, and the pen data, which are acquired at S2 of FIG. 4. As illustrated in FIG. 5, the control circuit 37 starts the pen position detection process and determines the pen-detection-continuing flag (S10). When the pen-detection-continuing flag is "N," the control circuit 37 starts global scan (S11). When the pen-detection-continuing flag is "affirmative (Y)," the control circuit 37 starts local scan (S12).

Figure 6:
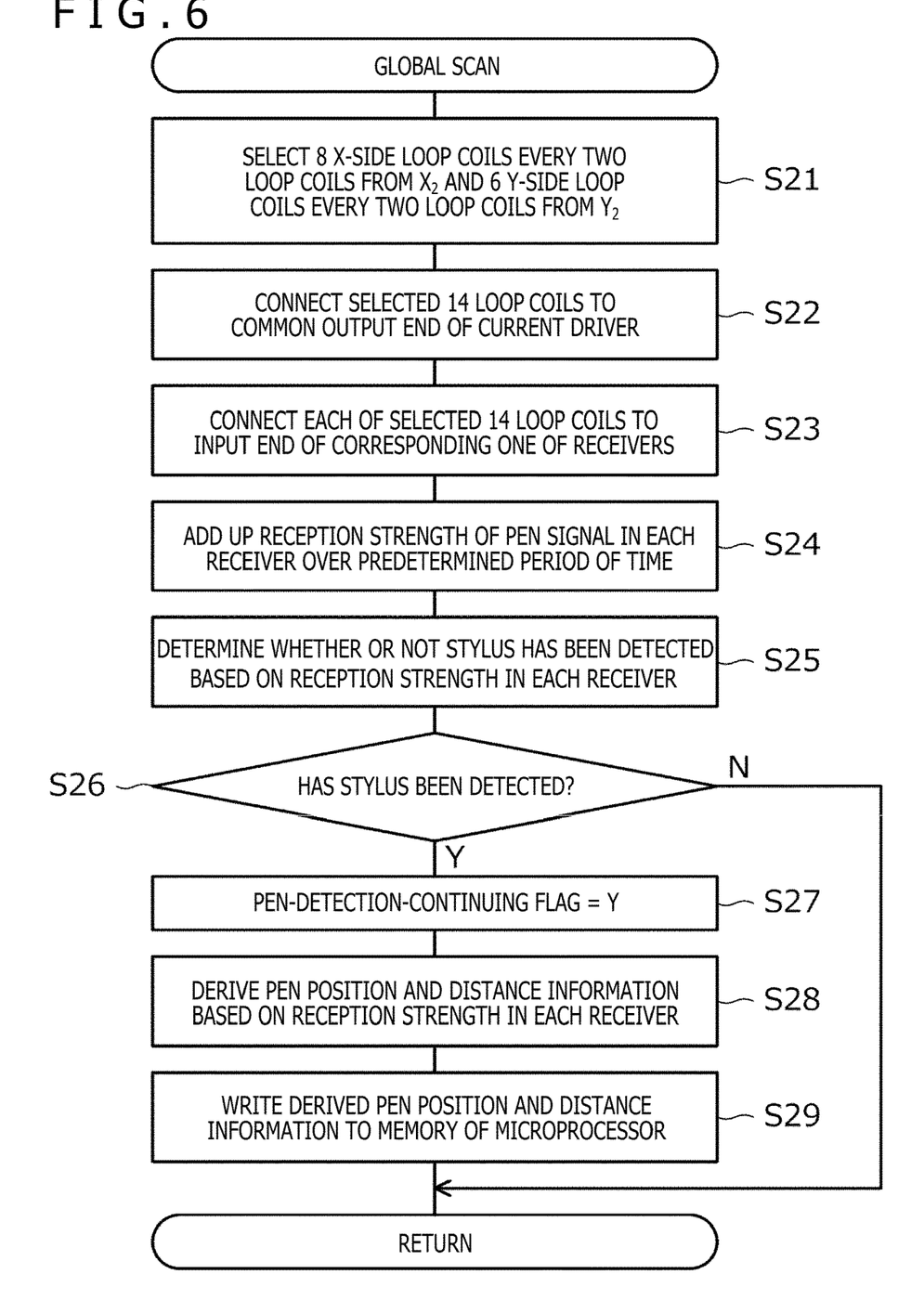
FIG. 6 is a processing flow diagram illustrating the details of global scan performed at S11 of FIG. 5.

FIG. 6 is a processing flow diagram illustrating the details of the global scan performed at S11 of FIG. 5. To start the global scan, the control circuit 37 first selects a plurality of loop coils LC discretely disposed, from among the plurality of loop coils LC included in the sensor 12 (S21). In the example illustrated in FIG. 6, the control circuit 37 selects a total of 14 loop coils LC including 8 X-side loop coils $X_2$, $X_5$, $X_8$, $X_{11}$, $X_{14}$, $X_{17}$, $X_{20}$, and $X_{23}$ every two loop coils from the loop coil $X_2$, and 6 Y-side loop coils $Y_2$, $Y_5$, $Y_8$, $Y_{11}$, $Y_{14}$, and $Y_{17}$ every two loop coils from the loop coil $Y_2$. In this case, at least 14 receivers 31 are provided in the sensor controller 14. The following description will continue under this assumption.

Next, the control circuit 37 controls the selection circuit 30 so as to connect the selected 14 loop coils LC to the common output end of the current driver 39 (S22). In response, a current signal flows through the selected 14 loop coils LC, generating a magnetic field on the touch surface.

After a predetermined period of time has elapsed since the performance of S22, the control circuit 37 controls the selection circuit 30 so as to connect each of the selected 14 loop coils LC to the input end of a corresponding one of the receivers 31 (S23). At this time, each of the selected loop coils LC is connected to a corresponding different one of the receivers 31. Accordingly, the control circuit 37 can receive the pen signal received in each loop coil LC in parallel.

Next, the control circuit 37 adds up the reception strength of the pen signal in each receiver 31 over a predetermined period of time (S24). As described above, since the control circuit 37 receives the pen signal received by each loop coil LC in parallel, the control circuit 37 can continuously add up the pen signal during the transmission of the pen signal. Therefore, the reception strength of the pen signal can be added up over a longer period of time than the case where the pen signal received by each loop coil LC is received in a time-division manner. The resulting effect will be described in more detail below with reference to FIGS. 7A to 7C.

Figure 7A:
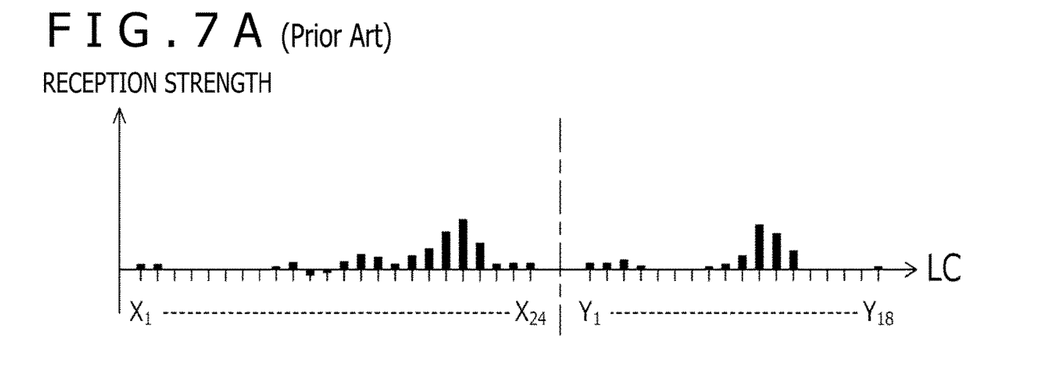
FIG. 7A is a diagram illustrating an example of the reception strength of a pen signal in each loop coil, the pen signal being received by a sensor controller during global scan using related art (in a case where the distance between a stylus and a touch surface is relatively short)
Figure 7B:
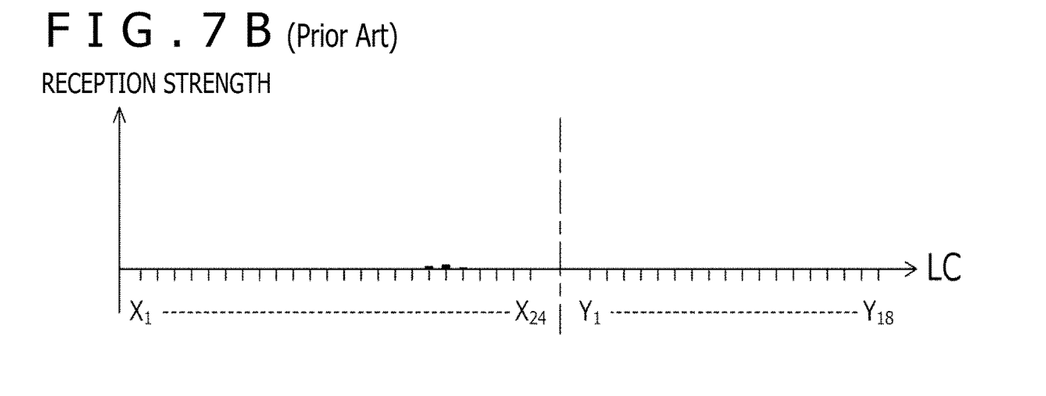
FIG. 7B is a diagram illustrating an example of the reception strength of a pen signal in each loop coil, the pen signal being received by the sensor controller during global scan using the related art (in a case where the distance between the stylus and the touch surface is relatively long)
Figure 7C:
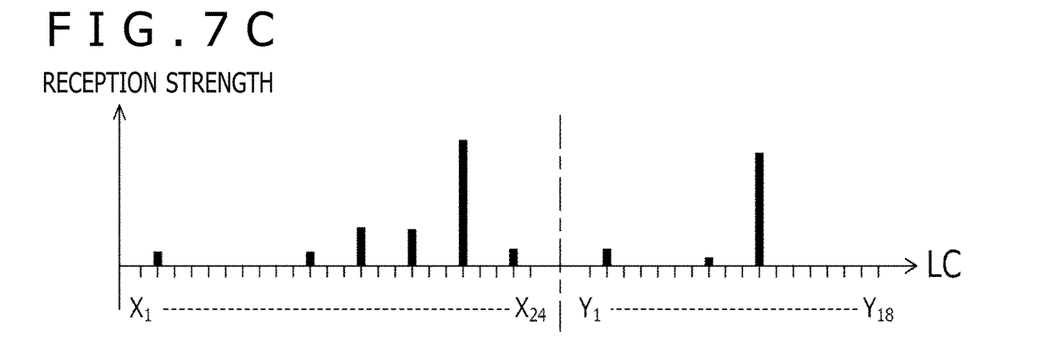
FIG. 7C is a diagram illustrating an example of the reception strength of a pen signal in each loop coil, the pen signal being received by the sensor controller during the global scan illustrated in FIG. 6 (in a case where the distance between the stylus and the touch surface is relatively long)

FIGS. 7A and 7B are diagrams each illustrating an example of the reception strength of the pen signal in each loop coil LC, the pen signal being received by a sensor controller during global scan using related art. FIG. 7C is a diagram illustrating an example of the reception strength of the pen signal in each loop coil LC, the pen signal being received by the sensor controller 14 during the global scan illustrated in FIG. 6. Note that FIG. 7A illustrates a case where the distance information is relatively short, while FIGS. 7B and 7C illustrate cases where the distance information is relatively long. The distance information in FIG. 7B is the same value as the distance information in FIG. 7C.

In FIGS. 7A and 7B, the sensor controller includes only one receiver 31 to receive a pen signal received in each loop coil LC in a time-division manner. As illustrated in FIG. 7A, even under such time-division reception, as long as the distance information is relatively short, sufficient reception strength can be acquired in each loop coil LC located close to a stylus S. Therefore, the sensor controller can detect the stylus S. Specifically, if the distance information is within approximately 3 cm (or within 1.1 cm in the case of a stylus including an integrated circuit since power needs to be supplied to the integrated circuit), the sensor controller can detect the stylus S.

However, as illustrated in FIG. 7B, if the distance information is relatively long, sufficient reception strength cannot be acquired in even each loop coil LC located close to the stylus S because the reception is limited to a short time under the time-division reception. As a result, the sensor controller cannot detect the stylus S. Specifically, when the distance information exceeds 3 cm (or 1.1 cm), the sensor controller cannot detect the stylus S.

In order to suitably prevent false detection of touch input during pen input through the process illustrated in FIG. 9 described later, the sensor controller 14 needs to be able to detect the stylus S at a distance of approximately 5 cm from the touch surface. In the example illustrated in FIG. 7C, since the receiver 31 is provided for each loop coil LC, the control circuit 37 can receive each pen signal in parallel. With this configuration, the time to add up the reception strength in each loop coil LC is longer than that with the related art. Therefore, although the distance information in FIG. 7C is the same value as the distance information in FIG. 7B, the sensor controller 14 can acquire sufficient reception strength in each loop coil LC located close to the stylus S. Thus, according to the present embodiment, the control circuit 37 can detect the stylus S at a farther location, compared to the related art.

In addition, in the global scan according to the present embodiment, the pen signal is received by using not all the loop coils LC but the plurality of loop coils LC discretely disposed among the plurality of loop coils LC (specifically, a total of 14 loop coils LC including the 8 X-side loop coils $X_2, X_5, X_8, X_{11}, X_{14}, X_{17}, X_{20}$, and $X_{23}$ every two loop coils from the loop coil $X_2$, and the 6 Y-side loop coils $Y_2, Y_5, Y_8, Y_{11}, Y_{14}$, and $Y_{17}$ every two loop coils from the loop coil $Y_2$). This configuration can reduce the number of receivers 31. This, in turn, decreases the number of components and manufacturing cost of the electronic device 10 while ensuring the detection of the stylus S on the entire touch surface. In the present embodiment, although the loop coils LC are selected "every two loop coils," the loop coils LC may be selected "every loop coil" or "every three loop coils" as long as the stylus S can be detected on the entire touch surface. Moreover, the interval between the loop coils LC used to receive the pen signal does not need to be constant.

Referring back to FIG. 6, after S24, the control circuit 37 determines whether or not the stylus S has been detected based on the finally acquired reception strength in each receiver 31 (S25 and S26). Specifically, when there is at least one receiver 31 whose reception strength is equal to or greater than a predetermined value, it is sufficient to determine that the stylus S has been detected.

When the control circuit 37 determines that the stylus S has not been detected at S25 and S26, the control circuit 37 ends the global scan. On the other hand, when the control circuit 37 determines that the stylus S has been detected at S25 and S26, the control circuit 37 sets the pen-detection-continuing flag to "Y" (S27) and derives the pen position and the distance information based on the reception strength in each receiver 31 (S28). Note that a function or a table in which the reception strength is mapped to the distance information may be prepared in advance, and the control circuit 37 may derive the distance information by performing calculation using this function or referring to this table. Finally, the control circuit 37 writes the derived pen position and distance information to the memory of the microprocessor 15 (S29) and ends the global scan. After completing the global scan, the control circuit 37 returns to S10 to continue the process, as illustrated in FIG. 5.

Figure 8:
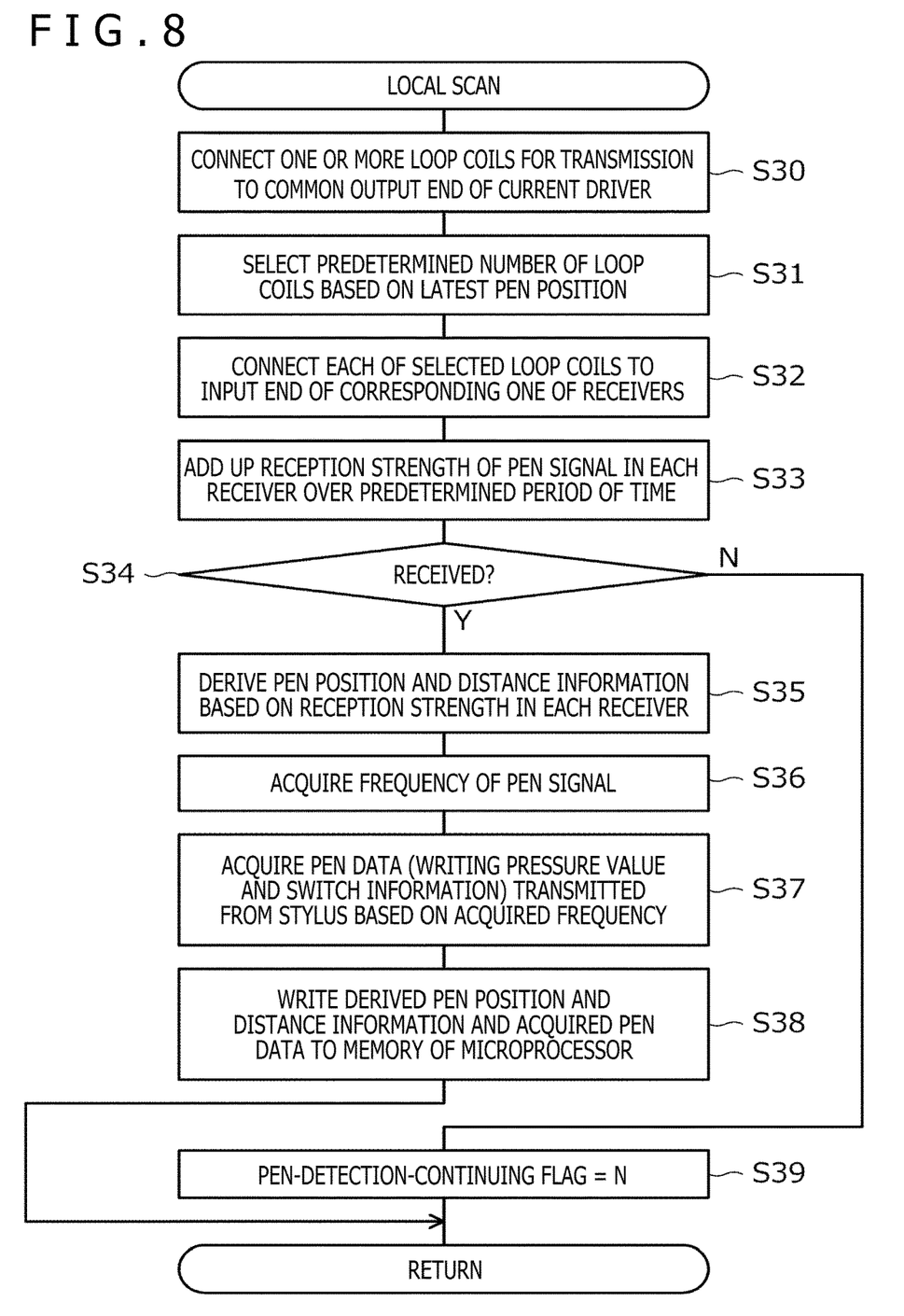
FIG. 8 is a processing flow diagram illustrating the details of local scan performed at S12 of FIG. 5.

FIG. 8 is a processing flow diagram illustrating the details of the local scan performed at S12 of FIG. 5. After starting the local scan, the control circuit 37 selects one or more loop coils LC for transmission and controls the selection circuit 30 so as to connect the selected one or more loop coils LC for transmission to the common output end of the current driver 39 (S30). Note that the one or more loop coils LC for transmission selected here may be predetermined or may be determined based on the latest pen position.

Next, the control circuit 37 selects a predetermined number of loop coils LC based on the latest pen position (S31). After a predetermined period of time has elapsed since the performance of S30, the control circuit 37 controls the selection circuit 30 so as to connect each of the selected loop coils LC to the input end of a corresponding one of the receivers 31 (S32). At S31, the control circuit 37 preferably selects a predetermined number of X-side loop coils and a predetermined number of Y-side loop coils (e.g., three loop coils each) in order from the one closest to the latest pen position. At S32, preferably, each of the selected loop coils LC is connected to a corresponding different one of the receivers 31.

Next, the control circuit 37 adds up the reception strength of the pen signal in each receiver 31 over a predetermined period of time (S33). At S33 as well, the add-up time can be longer than that with the related art, as with S24 of FIG. 6. Thus, compared to the related art, the control circuit 37 can detect the stylus S at a farther location, as with the global scan.

Next, the control circuit 37 determines whether or not the pen signal has been received at S33 (S34). When the reception strength acquired at S33 is equal to or greater than a predetermined threshold value, it is sufficient to determine that the pen signal has been received. When the control circuit 37 determines at S34 that the pen signal has not been received, the control circuit 37 sets the pen-detection-continuing flag to "N" (S39) and ends the local scan. In this case, as understood from FIG. 5, the control circuit 37 performs the global scan in the next pen position detection process.

On the other hand, when the control circuit 37 determines at S34 that the pen signal has been received, the control circuit 37 derives the pen position and the distance information based on the reception strength in each receiver 31 (S35). Further, the control circuit 37 acquires the frequency of the received pen signal (S36) and acquires pen data (a writing pressure value and switch information) transmitted from the stylus S, based on the acquired frequency (S37). Then, the control circuit 37 writes the derived pen position and distance information and the acquired pen data to the memory of the microprocessor 15 (S38) and ends the local scan. After completing the local scan, the control circuit 37 returns to S10 to continue the process, as illustrated in FIG. 5.

Referring back to FIG. 4, the microprocessor 15 which has acquired the pen position, the distance information, and the pen data at S2 outputs the acquired pen position and pen data to the host processor 17 while adding the acquired distance information to the time-series data of the distance information stored in the memory (S3). The microprocessor 15 temporarily stores the writing pressure value included in the acquired pen data, in the memory (S4).

Next, the microprocessor 15 acquires the touch position written to the memory by the sensor controller 13 (S5) and adds the acquired touch position to the time-series data of the touch position stored in the memory (S6). The microprocessor 15 then performs a touch position detection flag determination process (S7).

Figure 9:
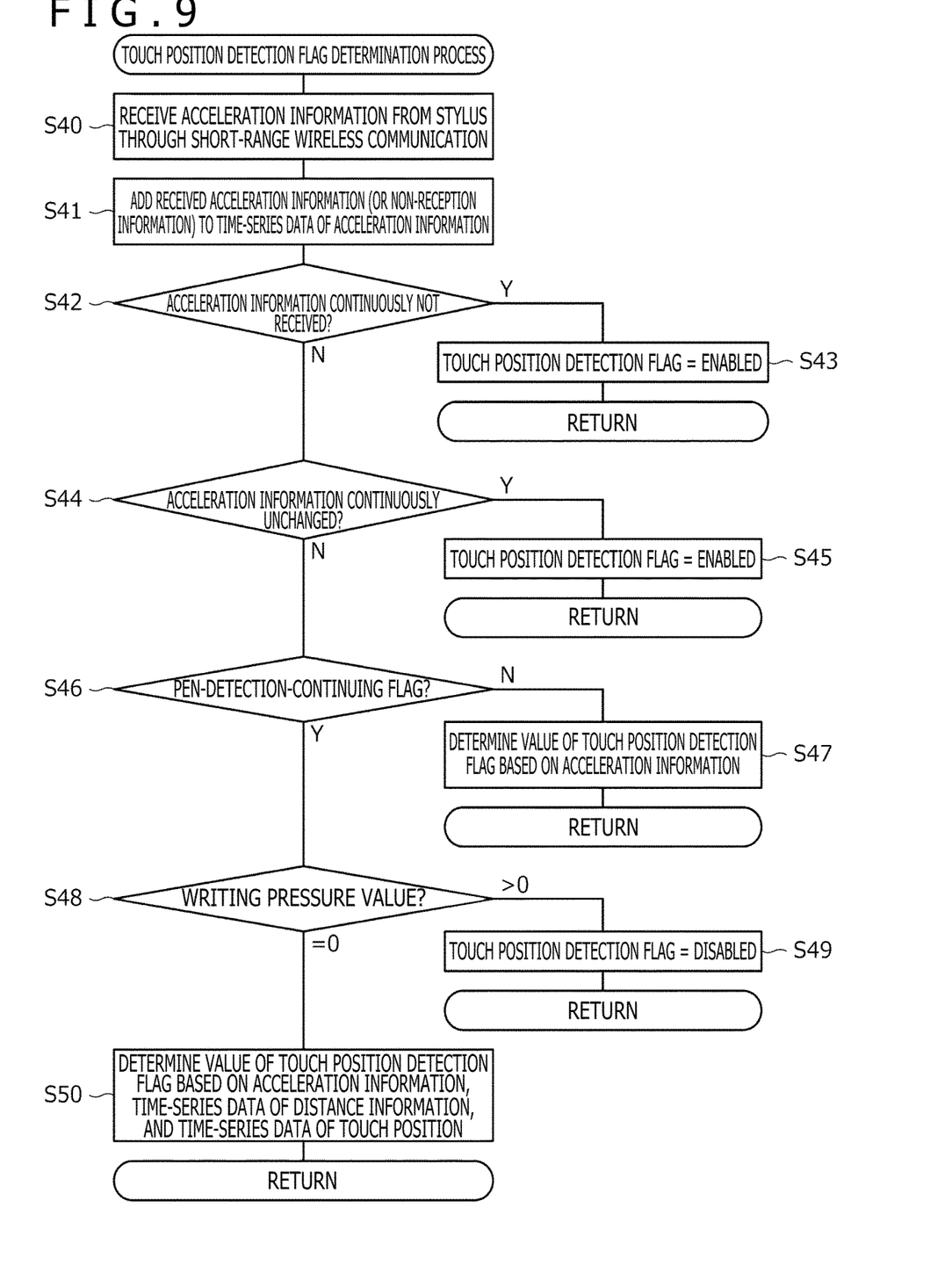
FIG. 9 is a processing flow diagram illustrating the details of a touch position detection flag determination process performed at S7 of FIG. 4.

FIG. 9 is a processing flow diagram illustrating the details of the touch position detection flag determination process performed at S7 of FIG. 4. As illustrated in FIG. 9, the microprocessor 15 first acquires acceleration information described above from the stylus S by performing short-range wireless communication with the stylus S via the communication circuit 18 illustrated in FIG. 1 (S40). Then, the microprocessor 15 adds the acquired acceleration information to the time-series data of the acceleration information stored in the memory (S41). When the microprocessor 15 does not receive the acceleration information at S40, the microprocessor 15 adds non-reception information to this time-series data. The non-reception information indicates that the acceleration information is not received.

Next, by referring to the time-series data of the acceleration information generated at S41, the microprocessor 15 determines whether or not the acceleration information has not been received at S40 for a predetermined period of time or longer (S42). As a result, when the microprocessor 15 determines at S42 that the acceleration information has not been received for the predetermined period of time or longer, the microprocessor 15 sets the touch position detection flag to "enabled" (S43) and ends the touch position detection flag determination process. When the acceleration information has not been received for the predetermined period of time or longer, it can be considered that the stylus S is not in the vicinity of the electronic device 10. In this case, the restriction on the output of the touch position is lifted, and the microprocessor 15 outputs the touch position to the host processor 17, as described in detail later. Accordingly, touch input becomes possible.

On the other hand, when the microprocessor 15 determines at S42 that the acceleration information has been received, the microprocessor 15 refers to the time-series data of the acceleration information generated at S41 again to determine whether or not there has been no change in the acceleration information received at S40 for a predetermined period of time or longer (S44). As a result, when the microprocessor 15 determines at S44 that there has been no change in the acceleration information for the predetermined period of time or longer, the microprocessor 15 sets the touch position detection flag to "enabled" (S45) and ends the touch position detection flag determination process. When there has been no change in the acceleration information for the predetermined period of time or longer, it can be considered that the stylus S is placed on a desk or the like. In this case as well, the restriction on the output of the touch position is lifted, and touch input becomes possible, as described in detail later.

On the other hand, when the microprocessor 15 determines at S44 that there has been a change in the acceleration information, the microprocessor 15 determines the value of the pen-detection-continuing flag (S46). As a result, when the microprocessor 15 determines that the pen-detection-continuing flag is "N," that is, the stylus S has not been detected in the pen position detection process, the microprocessor 15 determines the value of the touch position detection flag based on the acceleration information received at S40 (S47). In a typical example, when the acceleration information indicates that the stylus S is moving in a predetermined direction (a direction determined in relation to the orientation of the touch surface; e.g., downward when the electronic device 10 is placed with the touch surface facing upward), the microprocessor 15 sets the touch position detection flag to "disabled." This is based on the assumption that, when the stylus S is moving toward the touch surface, it is highly likely that pen input will start shortly. As described in detail later, in this case, the output of the touch position is restricted, and the microprocessor 15 does not output the touch position to the host processor 17. Accordingly, the user is unable to perform touch input.

When the microprocessor 15 determines at S46 that the pen-detection-continuing flag is "Y," the microprocessor 15 determines whether or not the writing pressure value temporarily stored at S4 of FIG. 4 is greater than 0 (S48). As a result, when the microprocessor 15 determines that the writing pressure value is greater than 0, the microprocessor 15 sets the touch position detection flag to "disabled" (S49). This is based on the assumption that, when the writing pressure value is greater than 0, the pen tip of the stylus S is in contact with the touch surface, and it can be considered that pen input is being performed right now. In this case as well, the output of the touch position is restricted, and the user is unable to perform touch input, as described in detail later.

When the microprocessor 15 determines at S48 that the writing pressure value is 0, the microprocessor 15 determines the value of the touch position detection flag based on the acceleration information received at S40, the time-series data of the distance information generated at S3 of FIG. 4, and the time-series data of the touch position generated at S6 of FIG. 4 (described later) (S50) and ends the touch position detection flag determination process. This determination at S50 is made by using the machine learning circuit 16 illustrated in FIG. 1. This point will be described in detail below.

The machine learning circuit 16 receives, as input, a combination of the acceleration information, the time-series data of the distance information, and the time-series data of the touch position and outputs the touch position detection flag. As training data, the machine learning circuit 16 preliminarily learns the combination of the acceleration information, the time-series data of the distance information, and the time-series data of the touch position, in association with the touch position detection flag that matches this combination. This learning may be performed during manufacturing of the electronic device 10, by the user of the electronic device 10, or by both thereof. By configuring the machine learning circuit 16 in this manner, when the microprocessor 15 inputs the acceleration information received at S40, the time-series data of the distance information generated at S3 of FIG. 4, and the time-series data of the touch position generated at S6 of FIG. 4, into the machine learning circuit 16, the machine learning circuit 16 outputs the value ("enabled" or "disabled") of the touch position detection flag. According to the value of the touch position detection flag output in this manner, the microprocessor 15 determines the value of the touch position detection flag.

Figure 10:
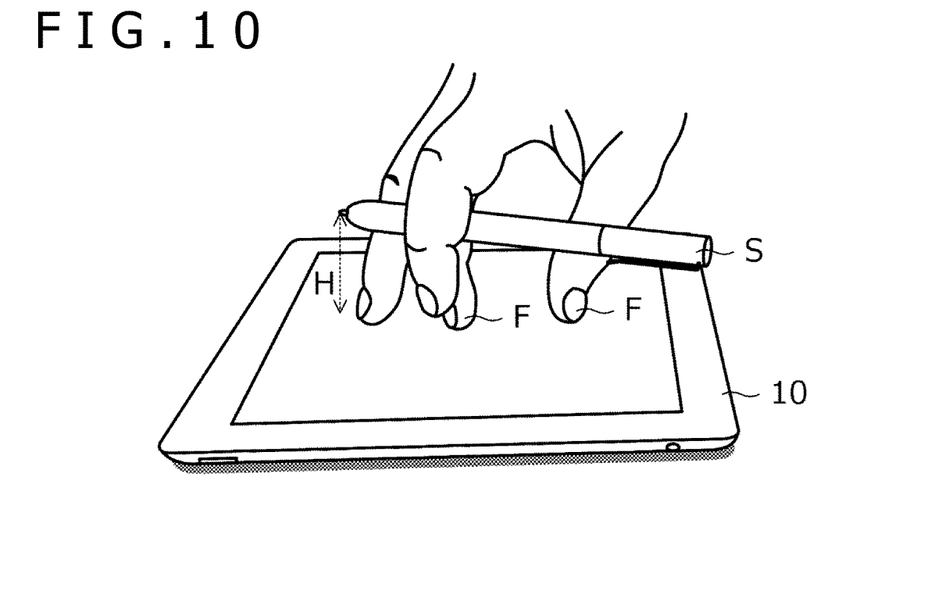
FIG. 10 is a diagram illustrating an example of a case where a value of a touch position detection flag is not determined in processes up to S49 of FIG. 9.

The reason why the process of S50 is performed is that the value of the touch position detection flag is not determined in the processes up to S49 in some cases. FIG. 10 is a diagram illustrating an example of such a case. In this example, the user is holding the stylus S with four fingers of the thumb, middle finger, index finger, and ring finger of the user's right hand while performing touch input with the thumb and middle finger of the right hand. In this case, since the distance between the stylus S and the electronic device 10 is close, the communication circuit 18 is able to receive the acceleration information, and the stylus S is detected in the pen position detection process. In addition, since the stylus S is held by the human hand, the received acceleration information varies. Further, since the pen tip of the stylus S is floating, the writing pressure value acquired is 0. Therefore, the value of the touch position detection flag is not determined in the processes up to S49. This is the reason why the process of S50 is performed.

In the case of the example illustrated in FIG. 10, it is difficult to uniformly determine whether the user is going to perform pen input from now on. However, using the machine learning circuit 16 makes it possible to capture the user's slight movement that is made when pen input is going or not going to be performed, and set the touch position detection flag to "enabled" or "disabled" accordingly. This configuration can, therefore, suitably prevent false detection of touch input during pen input.

Referring back to FIG. 4, when the microprocessor 15 ends the touch position detection flag determination process of S7, the microprocessor 15 determines the value of the touch position detection flag (S8). When the touch position detection flag is "disabled," the microprocessor 15 returns to the process of S2. On the other hand, when the touch position detection flag is "enabled," the microprocessor 15 outputs the touch position acquired at S5, to the host processor 17 (S9) and returns to the process of S2.

As described above, in the electronic device 10 according to the present embodiment, the microprocessor 15 controls the output of the touch position based on the acceleration information, the time-series data of the distance information, and the time-series data of the touch position. This configuration can prevent false detection of touch input during pen input more suitably than the related art that performs only a process of turning off touch input while the stylus S is being detected or a process of ignoring a region in which the finger F is being detected, when the area of this region is equal to or greater than a predetermined value.

In the electronic device 10 according to the present embodiment, the plurality of receivers 31 are disposed in the sensor controller 14 to receive, in parallel, the pen signal arriving at each loop coil LC. Therefore, compared to the related art in which the pen signal arriving at each loop coil LC is received in the time-division manner, the electronic device 10 according to the present embodiment can detect the stylus S at a farther location. This configuration according to the present embodiment can, therefore, more suitably prevent false detection of touch input during pen input. However, as described above, if the output of the touch position is controlled based on the acceleration information acquired by the acceleration sensor 21 of the stylus S, it is possible to suitably prevent false detection of the touch input during pen input. Therefore, it is not necessarily required to receive in parallel the pen signal arriving at each loop coil LC.

Although the preferred embodiment of the present disclosure has been described, it is to be understood that the present disclosure is not limited to the above-described embodiment and may be implemented in various embodiments without departing from the scope of the present disclosure.

For example, in the embodiment described above, the microprocessor 15 determines the value of the touch position detection flag (that is, controls the output of the touch position) based on three types of data, that is, the acceleration information, the time-series data of the distance information, and the time-series data of the touch position. Alternatively, even if the microprocessor 15 determines the value of the touch position detection flag based on only one or two types of data among these three types of data, it is also possible to provide an effect to some extent. In this case, the machine learning circuit 16 receives only one or two types of data as input. In addition, the time-series data of the acceleration information may be used instead of an instantaneous value of the acceleration information. An instantaneous value of the distance information may be used instead of the time-series data of the distance information. An instantaneous value of the touch position may be used instead of the time-series data of the touch position.

In the embodiment described above, when the touch position detection flag is "disabled," the microprocessor 15 restricts the output of the touch position by not outputting the touch position to the host processor 17. Alternatively, the touch position detection process itself performed by the sensor controller 13 may be stopped. Alternatively, a driver software of the host processor 17 may function as part of the controller of the position detection device. In this case, the driver software may restrict the output of the touch position by stopping supplying the touch position to an application.

In the embodiment described above, the sensor 12 using the electromagnetic resonance method is employed to detect the stylus S. Alternatively, the sensor 11 using the capacitive method may be employed to detect the stylus S. In this case, for example, it is sufficient to employ an active capacitive method to detect the stylus S. The distance information within which the pen signal can be received is greater with the active capacitive method than the electromagnetic resonance method. Therefore, it is possible to detect the stylus S at a distance of approximately 5 cm from the touch surface without the need for the configuration of parallel reception of the pen signal described above.

What is claimed is:

1. A position detection device comprising:
   a communication circuit which, in operation, receives, from a stylus including a built-in acceleration sensor, acceleration information detected by the acceleration sensor; and
   a controller which, in operation, detects a first position indicating a position of the stylus on a touch surface and a second position indicating a position of a finger on the touch surface, outputs the first position, determines whether there has been a change in the acceleration information received for a predetermined period of time by the communication circuit, and controls output of the second position based on whether there has been the change in the acceleration information received for the predetermined period of time by the communication circuit.

2. The position detection device according to claim 1, wherein the controller controls the output of the second position based on the acceleration information and the detected second position.

3. The position detection device according to claim 1, wherein the acceleration sensor is a three-axis inertial sensor.

4. The position detection device according to claim 1, wherein the controller controls the output of the second position based on the acceleration information and distance information indicating a distance between the stylus and the touch surface.

5. The position detection device according to claim 1,
   wherein the controller includes a machine learning circuit which, in operation, receives, as input, at least one of the acceleration information, distance information indicating a distance between the stylus and the touch surface, and the second position, and outputs restriction/no-restriction indication information indicating whether to restrict the output of the second position, and
   wherein the controller controls the output of the second position based on the restriction/no-restriction indication information output from the machine learning circuit in response to the input of the at least one of the acceleration information, the distance information, and the second position.

6. The position detection device according to claim 1, wherein the controller lifts a restriction on the output of the second position in response to determining that the communication circuit has not received the acceleration information for the predetermined period of time or longer.

7. The position detection device according to claim 1, wherein the controller lifts a restriction on the output of the second position in response to determining that there has been no change in the acceleration information received by the communication circuit for the predetermined period of time or longer.

8. The position detection device according to claim 1, wherein the controller restricts the output of the second position in response to determining that the stylus has not been detected and the acceleration information indicates that the stylus is moving in a predetermined direction.

9. The position detection device according to claim 1, wherein the controller restricts the output of the second position in response to determining that a writing pressure value received from the stylus indicates that a pen tip of the stylus is in contact with the touch surface.

10. The position detection device according to claim 1, further comprising:
    a sensor including a plurality of loop coils discretely disposed in the touch surface,
    wherein the controller includes a plurality of receivers,
    wherein the controller, in operation, selects at least some loop coils, from among the plurality of loop coils, and connects each of the at least some loop coils selected to a corresponding different one of the receivers, and
    wherein the controller, in operation, acquires, based on an output signal output from each of the plurality of receivers, a reception strength of a pen signal transmitted from the stylus and received by each of the at least some loop coils, and detects the first position based on the acquired reception strength.

11. The position detection device according to claim 10,
    wherein the controller, in operation, selects some loop coils that are discretely disposed, from among the plurality of loop coils, and connects each of the some loop coils selected to a corresponding different one of the receivers, and
    wherein the controller acquires, based on an output signal output from each of the plurality of receivers, a reception strength of a pen signal transmitted from the stylus and received by each of the some loop coils, and detects the first position based on the acquired reception strength.

12. A non-transitory computer-readable storage medium storing a program that, when executed by one or more processors, causes a computer, which includes a communication circuit that receives, from a stylus including a built-in acceleration sensor, acceleration information detected by the acceleration sensor, to:
    detect a first position indicating a position of the stylus on a touch surface and a second position indicating a position of a finger on the touch surface;
    output the first position;
    determine whether there has been a change in the acceleration information received for a predetermined period of time by the communication circuit; and
    control output of the second position based on whether there has been the change in the acceleration information received for the predetermined period of time by the communication circuit.

13. The computer-readable storage medium according to claim 12, wherein the program, when executed by the one or more processors, causes the computer to:
    control the output of the second position based on the acceleration information and the detected second position.

14. The computer-readable storage medium according to claim 12, wherein the program, when executed by the one or more processors, causes the computer to:
    acquire the acceleration information via the communication circuit from the acceleration sensor that is a three-axis inertial sensor.

15. The computer-readable storage medium according to claim 12, wherein the program, when executed by the one or more processors, causes the computer to:

control the output of the second position based on the acceleration information and distance information indicating a distance between the stylus and the touch surface.

16. The computer-readable storage medium according to claim 12, wherein the program, when executed by the one or more processors, causes the computer to:
generate restriction/no-restriction indication information indicating whether to restrict the output of the second position based on machine learning performed using at least one of the acceleration information, distance information indicating a distance between the stylus and the touch surface, and the second position; and
control the output of the second position based on the restriction/no-restriction indication information in response to input of the at least one of the acceleration information, the distance information, and the second position.

17. The computer-readable storage medium according to claim 12, wherein the program, when executed by the one or more processors, causes the computer to:
lift a restriction on the output of the second position in response to determining that the communication circuit has not received the acceleration information for the predetermined period of time or longer.

18. The computer-readable storage medium according to claim 12, wherein the program, when executed by the one or more processors, causes the computer to:
lift a restriction on the output of the second position in response to determining that there has been no change in the acceleration information received by the communication circuit for the predetermined period of time or longer.

19. The computer-readable storage medium according to claim 12, wherein the program, when executed by the one or more processors, causes the computer:
restrict the output of the second position in response to determining that the stylus has not been detected and the acceleration information indicates that the stylus is moving in a predetermined direction.

20. The computer-readable storage medium according to claim 12, wherein the program, when executed by the one or more processors, causes the computer:
restrict the output of the second position in response to determining that a writing pressure value received from the stylus indicates that a pen tip of the stylus is in contact with the touch surface.

* * * * *